April 14, 1931.   C. H. LARSON   1,800,301
HEADLIGHT FOR AIRCRAFT AND THE LIKE
Filed Aug. 10, 1929   2 Sheets-Sheet 1
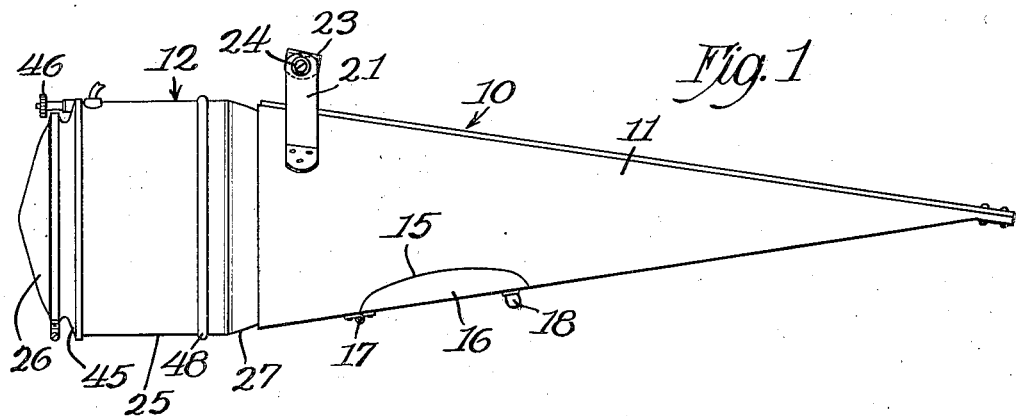
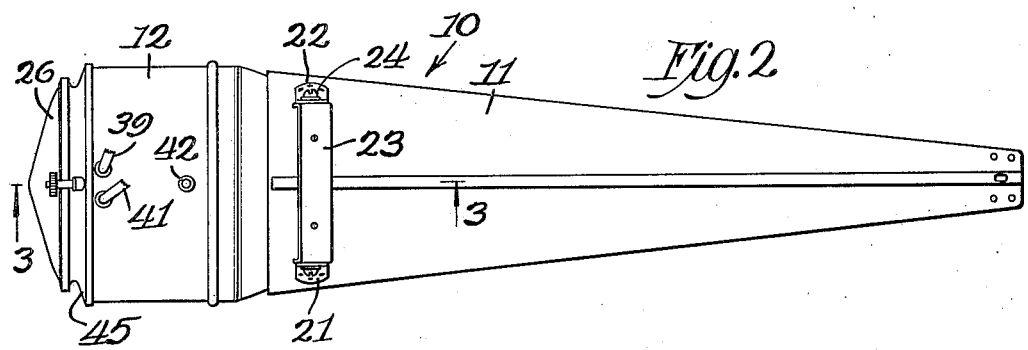
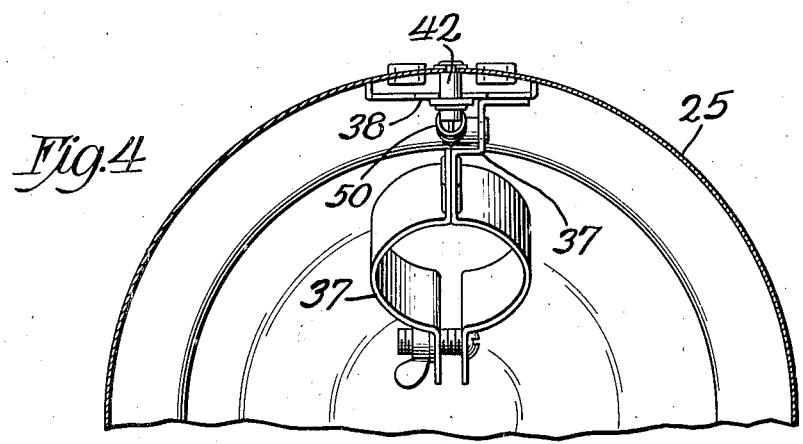
Inventor
Carl H. Larson
By Gillson, Mann & Co.
Attys.

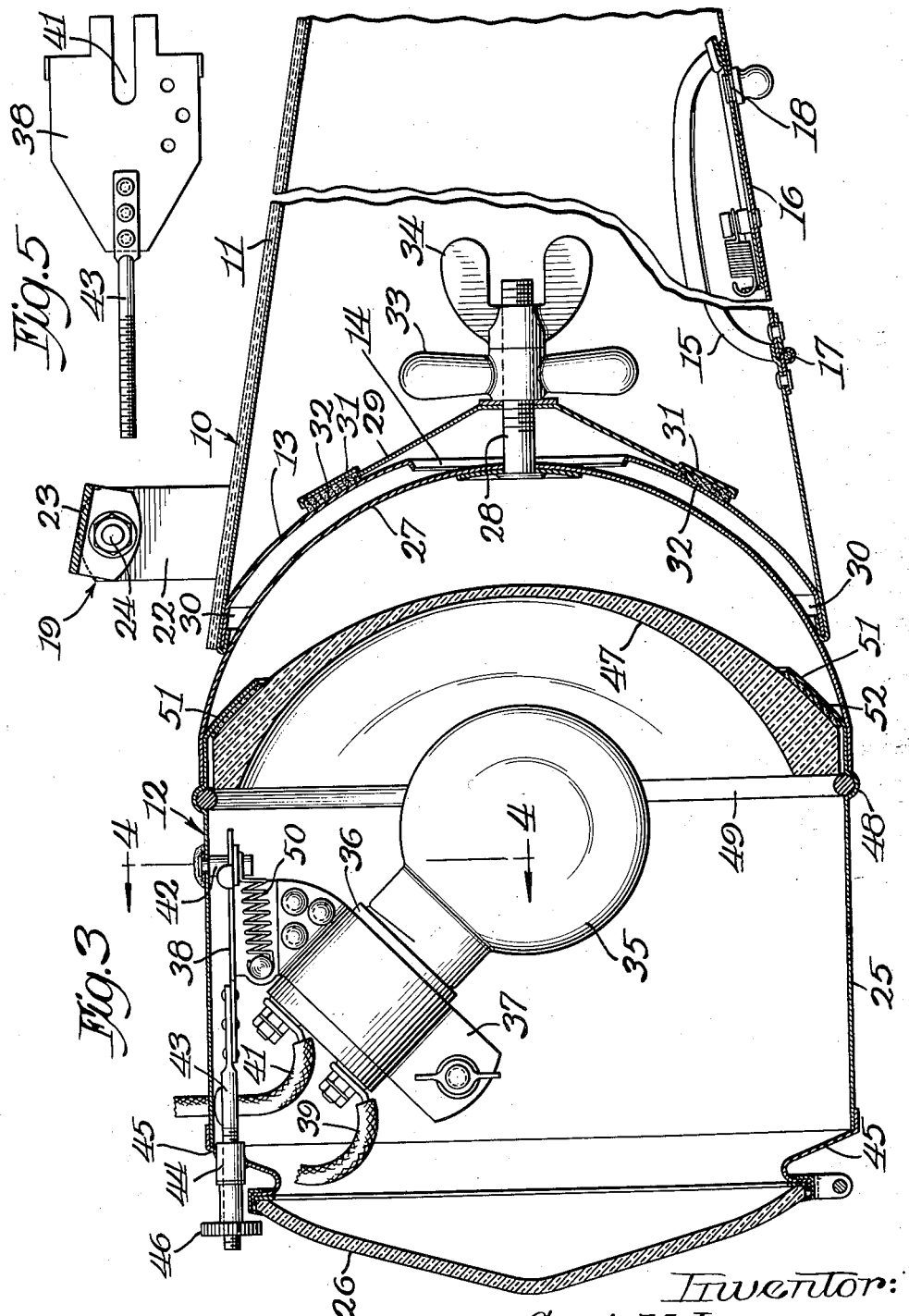

Patented Apr. 14, 1931

1,800,301

UNITED STATES PATENT OFFICE

CARL H. LARSON, OF ELKHART, INDIANA, ASSIGNOR TO THE ADLAKE COMPANY, A CORPORATION OF ILLINOIS

HEADLIGHT FOR AIRCRAFT AND THE LIKE

Application filed August 10, 1929. Serial No. 384,823.

This invention relates to headlights, and more particularly to headlights for aircraft and the like.

One of the objects of the invention is the provision of new and improved means for adjusting the headlight to change the direction effect of the projected rays.

Another object of the invention is the provision of new and improved mechanism within the lamp casing for focusing the source of light.

A further object of the invention is the provision of a new and improved headlight for aircraft that is cheap to manufacture, easily assembled and that may be readily focused and adjusted.

Other and further objects and advantages of the invention will appear from the following description taken in connection with the accompanying drawings, in which Fig. 1 is a side elevation of the device;
Fig. 2 is a plan thereof;
Fig. 3 is a section on line 3—3 of Fig. 2;
Fig. 4 is a section on line 4—4 of Fig. 3; and
Fig. 5 is a plan view of the adjusting plate.

In the construction of headlights for aircraft and the like, it is desirable that the parts be so arranged that the adjustments may all be accomplished in a simple manner without the necessity of employing objectionably protruding or obstructing parts. The great speeds at which vehicles of this type move through the air creates problems in air resistance that must be considered in designing aircraft of all classes.

The present invention seeks to provide a headlight that offers a minimum resistance to the air, that can be readily adjusted, and that has a minimum number of movable parts.

Referring now to the drawings, the reference character 10 designates a headlight designed for rapidly moving vehicles and especially adapted to the needs of aircraft and the like. The headlight 10 comprises the rear or streamline rear section 11 and the forward or lamp section 12 adjustably connected thereto.

The rear section is built on the streamline principle and is preferably substantially conical with its open end or base facing forwardly. A concave diaphragm or plate 13 is secured in the open end of the casing 11. The diaphragm 13 is provided with an enlarged opening 14 through which the adjusting bolt is adapted to extend as will presently appear.

The casing 11 is provided adjacent its forward end with an opening 15 through which access may be had to the adjusting mechanism. A closure 16 hinged as at 17 and conforming to the curvature and taper of said casing is provided for said opening. A spring-pressed latch 18 is adapted to hold the closure in closed position. The casing 11 is provided with a suitable supporting bracket 19 for supporting the headlight from the vehicle, on which it is employed. As shown, this bracket comprises the outwardly extending arms 21 and 22 to which the bail member 23 is adjustably attached as by the bolts 24 that pivotally adjustably connect the parts together.

The forward section of the headlight comprises the cylindrical lamp housing 25 having the transparent member 26 in its forward end. The transparent member 26 may be a lens if desired.

The rear end wall 27 of the housing 25 is oval or is convex as viewed from the rear for engaging in the concavity of the plate or diaphragm 13, as clearly shown in Fig. 3 of the drawings.

By means of this arrangement the forward section may be moved at various angles to the rear section by reason of the fact that the end wall 27 and diaphragm 13 are substantially concentric and cooperate to provide a type of ball and socket joint between the two sections of the headlight.

Suitable means are provided for holding the sections in adjusted position relative to one another. In the form of construction selected to illustrate one embodiment of the invention, the spherical wall 27 is provided with a bolt 28 that extends rearwardly axially of said housing and is adapted to extend through the enlarged opening 14. A cupped plate 29 of more or less resilient material having a central opening through which the bolt 28 extends is provided for frictionally engaging the diaphragm 13 for holding the parts in adjusted position. The edge of the plate 29 is preferably provided with a shallow channel 31 within which is seated a ring or gasket 32 of friction material for frictionally engaging the plate 13. The bolt 28 is provided with a thumb nut 33 and a lock nut 34 for clamping the parts in adjusted position. If desired, the plate 13 may be provided with a plurality of feet 30 extending about its forward edge for engaging the wall 27 when the parts are clamped in position.

The housing 12 is provided with a source of light 35, which in the form shown is an electric light bulb, the socket 36 of which is secured in position by a clamp 37 rigidly connected to the adjusting plate 38 in any suitable manner as by means of rivets or the like. Leads 39 and 41 supply the electric energy to the filament of the bulb for energizing the same.

Appropriate means are provided for adjusting the source of light longitudinally of the housing 25. Any suitable mechanism may be employed for this purpose. As shown, the adjusting plate 38, to which the bracket 37 is rigidly connected, is provided with a slot at one end, as at 41, which is adapted to engage a headed stud 42 rigidly connected to the wall of the housing. The plate 38 is provided with a foot 40 at each side thereof for engaging the upper wall of the housing 25 for holding the plate spaced therefrom. A threaded rod or bar 43, rigidly connected to the forward end of the plate 38, extends forwardly through a sleeve 44 secured in the glass or lens-retaining ring 45 of the housing 25. A nut 46 is provided for the threaded end of the rod 43 for moving the rod and the bulb 35, carried thereby, forwardly against the tension of a spring 50, which is adapted to move the plate 38 and rod 43 rearwardly when the nut is unscrewed. The nut 46 being located in front of the housing 25 not only affords a minimum resistance to the air, but is in such a position that the bulb may be adjusted without opening said housing. This is considered an important feature of the invention.

A suitable reflector, known in the trade as a decentered mirror 47, is mounted in the housing rearwardly of the bulb 45. The mirror is rigidly held in position by any suitable means. As shown, the cylindrical wall of the housing 25 is provided with a circular groove 48, in which is mounted a ring 49 against which the reflector 47 is adapted to abut. The rear end of the housing 25 is provided with an inwardly extending flange 51, which is adapted to engage the rear side of the reflector 47 for holding the same against the ring 49. A gasket 52 may be inserted between the flange 51 and the mirror.

When it is desired to angularly adjust the housing 25 the nuts 33 and 34 are loosened and the housing moved to the desired adjusted position and the nuts retightened.

When it is desired to adjust the source of light relative to the reflector, the nut 46 is tightened for moving the bulb 35 forwardly, and is released to enable the spring 50 to move the plate 38 and the source of light attached thereto rearwardly toward the reflector.

By means of this arrangement the beam of light projected forwardly may be angularly adjusted as occasion may require without the necessity of changing the position of the streamline casing 11, and without necessitating the use of complicated mechanism for adjusting the reflector. Furthermore, the adjusting mechanism being housed within the rear casing all air resistance is eliminated. The lamp housing and adjusting mechanism may be assembled before the same is attached to the streamline casing, and the same may be readily and easily detached from said casing for replacement and repairs.

When the parts are assembled they may be rigidly clamped together in such a manner that the front and rear sections constitute a rigid unit having streamline curves for minimizing the resistance of its passage through the air.

It is thought from the foregoing, taken in connection with the accompanying drawings, that the construction and operation of my device will be apparent to those skilled in the art, and that various changes in size, shape, proportion and details of construction may be made without departing from the spirit and scope of the appended claims.

I claim as my invention—

1. In a headlight for vehicles, a cone-shaped casing opening forwardly, a concave diaphragm in the forward end thereof, a lamp housing having its rear portion oval for engaging in said open end of said casing, means extending axially from said lamp casing through an enlarged opening in said diaphragm for angularly adjusting said housing relative to said casing, and means including a concave resilient member for holding said housing in adjusted position.

2. In a headlight for aircraft, a conical streamline casing, means for adjustably connecting said casing to a support, a concave plate in the open end of said casing, said plate having an enlarged axial opening, a lamp housing having a convex wall engaging in the concavity of said plate, said wall having a bolt member extending axially rearwardly therefrom, a resilient cupped plate having an axial opening through which said bolt member extends, said last-named plate having its edge engaging said first-named plate, and means engaging said bolt member for holding said housing in any one of a plurality of adjusted positions relative to said casing.

3. In a headlight for vehicles, a streamline casing, a lamp housing adjustably secured to the forward end of said casing, a source of light and a reflector within said housing, and unobstructed transparent member constituting the front wall of said housing, and means extending to the exterior of said casing adjacent the upper forward portion thereof for adjusting said source of light to and from said reflector parallel with the longitudinal axis of said housing.

4. As an article of manufacture, a cone-shaped casing having its forward end open, a concave diaphragm for closing said open end, said diaphragm having an enlarged central opening therethrough, a cup-shaped resilient plate for engaging the rear side of said diaphragm, said plate being adapted to close the opening in said diaphragm, and an adjusting bolt extending axially through said plate and adapted to engage a lamp housing for holding the same in adjusted position, means on said casing for adjustably connecting the same to a support, said casing having an opening in its conical wall adjacent to the open end of said casing, and a closure for said opening, said closure conforming to the curvature and taper of the wall of said casing.

5. As an article of manufacture, a lamp housing for an aircraft headlight comprising a cylindrical portion, a concave reflector mounted within said cylindrical portion, a bulb support within said casing comprising a clamp for engaging the socket for said bulb, a plate for supporting said clamp from the wall of said housing, a threaded rod engaging said plate and extending forwardly to the exterior of said housing, a thumb nut for engaging said rod for adjusting said socket forwardly, and a spring for moving said plate rearwardly upon the release of said nut.

6. In a headlight for vehicles, a cone-shaped casing, a concave diaphragm in the open end of said casing, said diaphragm being provided with an enlarged axial opening, a lamp housing having a convex rear wall for engaging in the concavity of said diaphragm, means for adjustably securing said housing to said casing comprising a bolt secured to said wall and extending rearwardly through said opening, a concave spring member on said bolt and engaging said diaphragm, and a nut for said bolt.

7. In a headlight for vehicles, a cone-shaped casing adapted to have its open end turned forwardly, a cylindrical lamp housing adjustably secured to said casing, a reflector within said housing, a source of light, means for supporting said source of light in the focus of said lens, and means for supporting said source of light comprising a plate having a slot in one end and a threaded portion on the other, a headed stud secured to the wall of said housing and engaging said slot, said threaded portion extending through the front wall of said housing, and a thumb nut for engaging the outer end of said threaded portion for moving said plate outwardly, and resilient means for moving said plate inwardly when said nut is loosened.

8. In a headlight for aircraft, a conical streamline casing, a concave plate in the open end of said casing, a lamp housing having a convex wall engaging in the concavity of said plate, and means for resiliently and adjustably clamping said wall to said plate whereby said lamp housing may be angularly adjusted relative to said casing.

In testimony whereof I affix my signature.

CARL H. LARSON.